Jan. 31, 1950        W. H. REINKING        2,495,907

POWER TAKE-OFF GRAIN AND FORAGE UNLOADER

Filed Oct. 26, 1948        2 Sheets-Sheet 1

INVENTOR.
WALTER H. REINKING

BY McMorrow, Berman & Davidson
ATTORNEYS

Jan. 31, 1950 W. H. REINKING 2,495,907
POWER TAKE-OFF GRAIN AND FORAGE UNLOADER
Filed Oct. 26, 1948 2 Sheets-Sheet 2

INVENTOR.
WALTER H. REINKING
BY
McMorrow, Berman & Davidson
ATTORNEYS

Patented Jan. 31, 1950

2,495,907

UNITED STATES PATENT OFFICE 2,495,907

POWER TAKE-OFF GRAIN AND FORAGE UNLOADER

Walter H. Reinking, Sumner, Iowa

Application October 26, 1948, Serial No. 56,533

5 Claims. (Cl. 214—83.32)

1

This invention relates to unloading devices for vehicles carrying grains, forage and the like, and refers particularly to a side unloader mounted upon a carrier vehicle and driven by a power take-off operated by a tractor connected to the vehicle.

The main object of my invention is to provide power-driven means for unloading grains and forage in a convenient manner from a vehicle serving as a carrier therefor.

Another object is to provide a special spiral unloading device driven by a power take-off and adapted to be mounted upon and combined with a wheeled grain and forage carrier for unloading the latter from one side of the carrier.

A further object is to provide a grain or forage carrier with a power-driven, transversely-arranged feed screw operating in a trough in the bottom of the carrier and serving to unload the latter from one side intermediate the ends thereof.

It is also an object to install such an unloading device beneath the floor of the load carrier and provide the latter with inclined forward and rear end walls which converge toward the trough of the unloading device in order to direct the load thereto by gravity.

A practical object is also to provide such a load carrier with short, flat floor sections intermediate the lower ends of the inclined forward and rear walls and the trough containing the feed screw to provide space upon which an operator may stand, and also a side door in the carrier to allow entry and exit of the operator.

Other objects and advantages of the invention will appear in further detail as the specification proceeds.

In order to facilitate ready comprehension of this invention for a proper appreciation of the salient features thereof, the invention is illustrated on the accompanying drawings forming part hereof, and in which.

Figure 1:
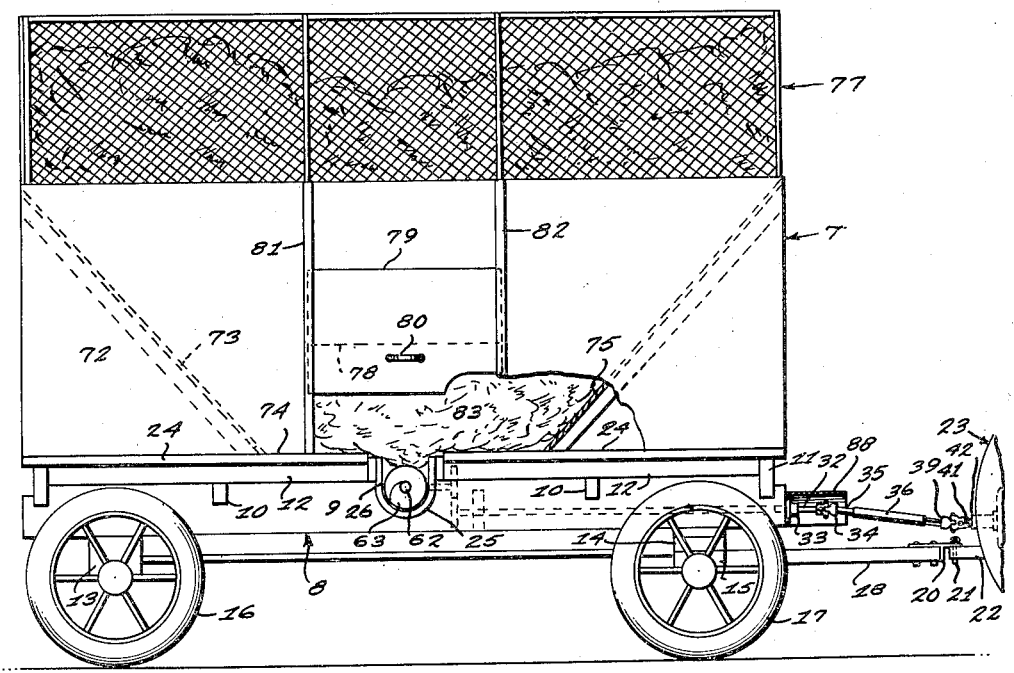
Figure 1 is a side elevation of a wheeled grain and forage carrier provided with a power-driven unloader, which, together with the carrier, is made according to the principles of this invention and embodies the same in a practical form.
Figure 2:
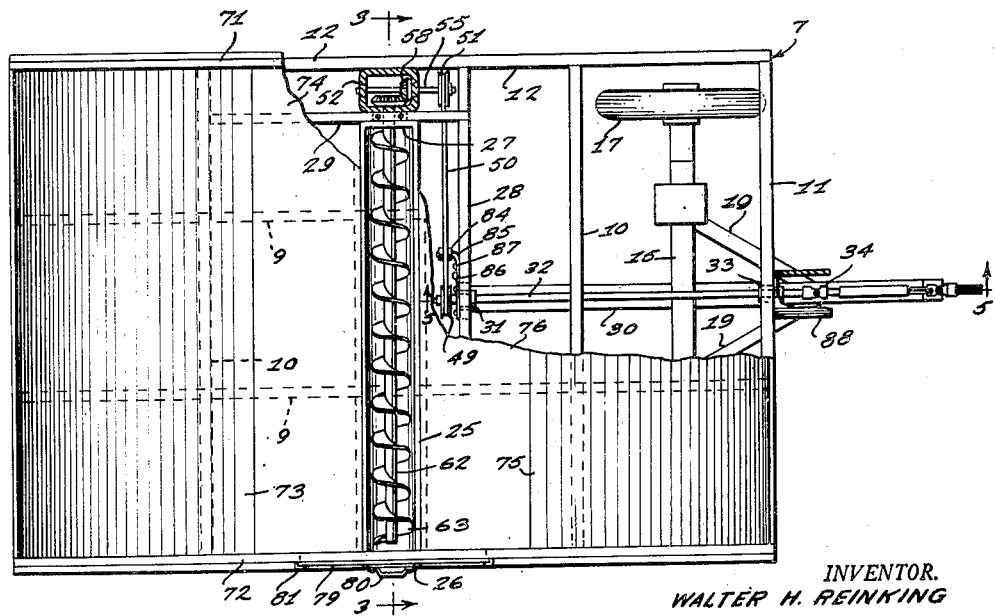
Figure 2 is a plan view of the apparatus of Figure 1, with portions broken away to disclose certain structural detail.
Figure 3:
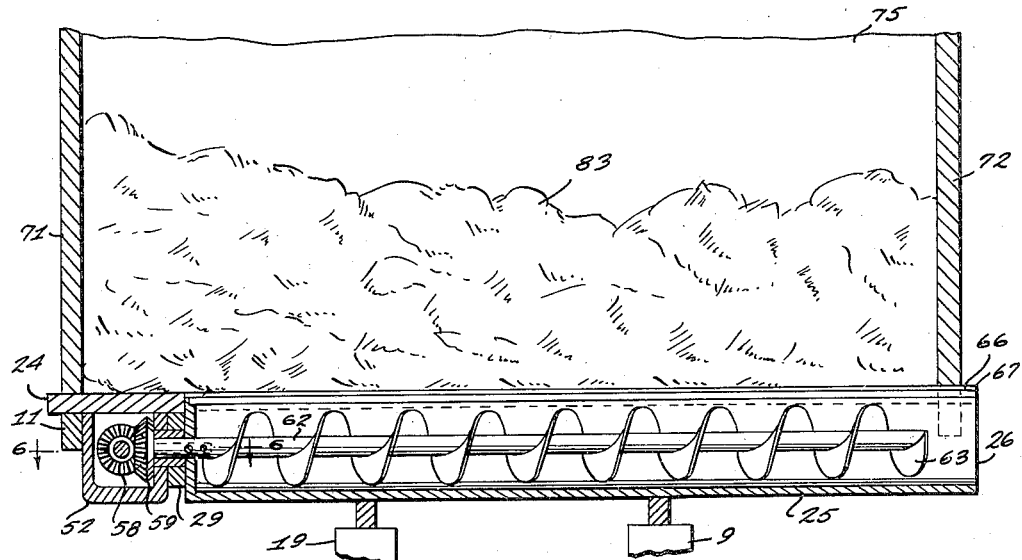
Figure 3 is a transverse section taken on line 3—3 in Figure 2.
Figure 4:
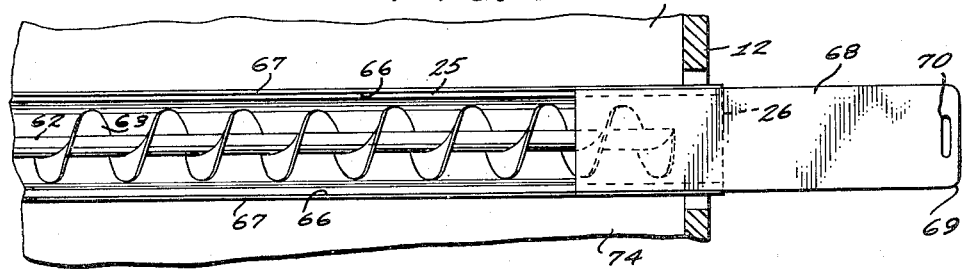
Figure 4 is a plan view partly in section of the intermediate portion of the carrier vehicle.
Figure 5:
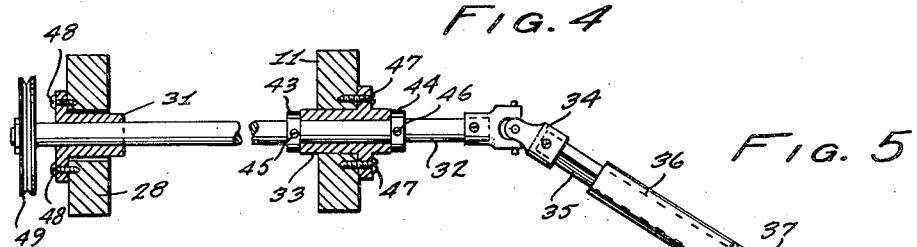
Figure 6:
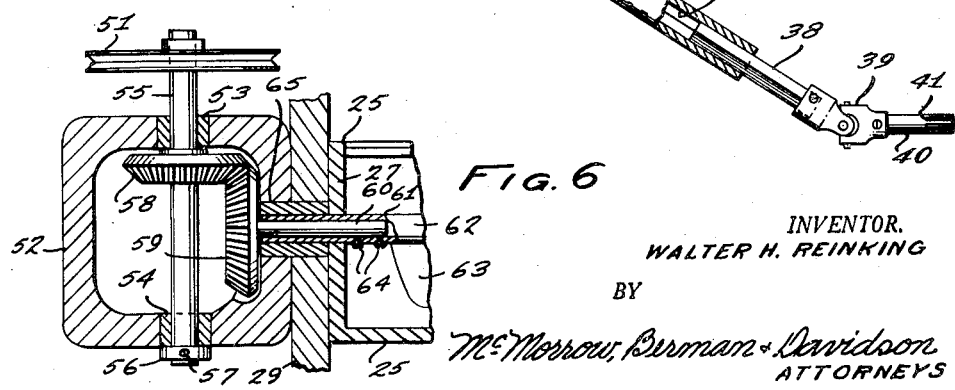

2 the trough containing the feed screw to illustrate how a cover may be slid over the feed screw;

Figure 5 is an enlarged sectional view of the power take-off connections of Figures 1 and 2, and especially as taken on line 5—5 in Figure 2;

Figure 6 is an enlarged section taken on line 6—6 in Figure 3.

In the various views, the same reference numerals indicate the same or like parts.

Upon the farm many expedients have been resorted to for gathering up and depositing grains and forage and various crops, but there appears to be a need for some convenient means for receiving a load of grains or forage, etc., capable of conveniently unloading such materials at a distant point in a convenient manner without the necessity of using conventional unwieldy loading vehicles which must be accurately connected or aligned with hoppers or chutes for receiving the load.

Upon considering this problem, I have found it quite feasible to produce a special load carrier capable of receiving crop materials as outlined and thereafter conveniently unloading the same from the carrier by power-driven means, as will now be fully explained.

Hence, in the practice of my invention, and referring again to the drawings, a grain or forage wagon or carrier, generally indicated at 7, includes a wheeled frame 8 comprising a pair of intermediate, longitudinal supporting members 9, 9, a pair of intermediate cross-pieces 10, 10, end cross-pieces 11, 11 and side reinforcing members 12, 12 at each side. The first-mentioned longitudinal members 9, 9 rest upon a rear axle structure 13, front axle cross-piece 14, a swiveling axle structure 15 beneath the latter, rear wheels 16 on the rear axle structure 13 and front wheels 17 on the front axle structure 15. To the latter is connected and secured a forwardly-projecting stub tongue 18 provided with a pair of rearwardly-diverging braces 19, 19 secured to the sides of the tongue and also to the axle 15 in order to ensure the rigid attachment of the stub tongue to the axle, so that the latter may be turned for steering by shifting the stub tongue to the right or the left. The stub tongue is provided at the forward end with a tongue structure 20 which may be secured by means of a pin 21 to a rear hitch 22 on a tractor generally indicated at 23.

Of course, if desired, the wagon or carrier frame so far described may be varied in many ways and merely serves to form an example of a wheeled support for the superstructure about to be described which forms the actual invention, and hence any structure may be adopted wherein even the front axle 15 is rigid and not capable of being steered, if that should be desired.

In any event, upon the longitudinal intermediate members 9, 9, as well as the side members 12, 12 are fixed a pair of floor sections 24, 24 which may, for the present purpose, be termed front and rear floor sections, which are separated transversely of the carrier as a whole by a transversely-disposed trough 25 which is open at the near side 26, while at the opposite side or far end of the trough 27 the latter is closed and terminates a short distance from the opposite side of the vehicle or carrier. A short distance forwardly of the trough is located a cross-piece 28 extending from the side members 12 on one side to the corresponding members on the other side, while rearwardly from the cross-member 28 extends a short, longitudinally-arranged supporting member 29 to the rear cross-piece 10. The mentioned member 29 serves to support the end 27 of trough 25, while the intermediate portion of the previously-mentioned cross-piece 28 is reinforced by a short longitudinal member 30 extending between the same forwardly and the front cross-piece 11, so that said cross-piece 28 will serve to support a bearing 31 for a driven shaft 32. This shaft extends forwardly beneath the forward cross-piece 11 and at the lower portion of the latter is fixed a front bearing 33 for this shaft, the latter having a universal joint 34 secured thereto. This joint has a forwardly-extending square shaft or shank 35 upon which is slidably mounted a sleeve 36 which has a corresponding square hole therethrough 37, as best seen in Figure 5, while forwardly from this sleeve extends a slidable square shank 38 of a second universal joint 39 with a forwardly-extending further shank 40 having a fluted end 41 adapted to extend into a rear drive member 42 of tractor 23 in well known manner. The universal joints 34, 39 with their shanks 35, 38, sleeve 36 and extreme shank 40 form a power take-off connection for bringing power from the tractor 23 to the carrier 7 through shaft 32, which thus forms a driven shaft.

Upon the driven shaft 32 are mounted a pair of collars 43, 44 secured by screws 45, 46 at both ends of bearing 33 in order to prevent the shaft from shifting axially during rotation, the bearing secured to the cross-piece 11 by means of a pair of screws 47, 47, while in similar fashion the rear bearing 31 is secured by screws 48, 48 to the cross-piece 28. Rearwardly of bearing 31, shaft 32 is provided with a grooved pulley 49 adapted to receive a belt 50 which extends to the far side of a carrier 7 beneath floor 24 to a pulley 51 with which it engages for the purpose of driving a special unloading means, as will now be described in detail.

As best seen in Figures 2, 3 and 6, a gear housing or box 52 is secured between the longitudinal supporting members 29 and 12 and provided with a pair of longitudinally-aligned bearings 53, 54 for a shaft 55 upon which the previously-mentioned pulley 51 is mounted exteriorly of gear box 52, while rearwardly of the latter is a collar 56 secured by set screw 57 to prevent forward displacement of the shaft. Internally of gear casing 52 is a bevel gear 58 fixed upon shaft 55 within bearing 53 meshing with a second bevel gear 59 having a shank 60 fixed in the hollow end 61 of a feed screw spindle 62 of a feed screw 63 extending in trough 25 from a short distance of end wall 27 of the trough to within a short distance of the open end 26 of the latter. The shank 60 of gear 59 is secured by a pair of screws 64 in the mentioned hollow end 61 of spindle 62 so that rotation of gear 59 will cause simultaneous rotation of feed screw 63 in the trough. In the inner side of gear box 52 is a bearing 65 which extends through longitudinal supporting member 29 for rotatably supporting the hollow end 61 of spindle 62 so that rotation of the spindle and feed screw 63 will be readily effected by rotation of pulley 51 and gear 58 meshing with gear 59 on the feed screw spindle.

In the upper opposite edges of the trough 25 are a pair of recessed shoulders 66 formed by upwardly-extending flanges 67, 67 between which a slidable trough cover 68 is removably located, the outer end 69 of the latter having a finger hole 70 by which to grasp it and pull it transversely through the carrier off the trough 25, when desired. The arrangement is such that when the power take-off connection including the universal joints, the sleeve 36, slidable square shanks 35 and 38 in the latter are rotated from the rear power take-off member 42 of tractor 23, shaft 32 beneath the floor 24 of carrier 7 will be rotated and as this rotates pulley 49, such rotation will be transmitted to pulley 51 and shaft 55 through belt 50, with the result that gear 58 on shaft 55 rotates gear 59 and thereby rotates spindle 62 and feed screw 63 in trough 25. It is self-evident that if the feed screw as shown is rotated counter-clockwise, any grains or forage material which may in any manner be fed directly downwardly into the trough will be fed through the trough toward the open end 26 thereof from which end such material will drop into any container or hopper which may be located thereunder.

In order to make efficient use of the nature and location of the feed screw 63, upon the floor sections 24, 24 are located an upright far side 71 and an upright near side 72 forming the sides of the carrier, and between the sides are disposed a rearwardly-inclined back wall 73 extending from the upper rear portion of the near side 72 and the far side 71 downwardly to within a short distance of trough 25, so that a short section 74 of flooring is disposed between the lower end of rear inclined wall 73 and the trough. In similar fashion, the rearwardly-inclined front wall 75 extends from the upper front corners of sides 71 and 72 to the forward floor section 24 and to within a short distance of the forward edge of trough 25 to present a short floor section 76 between the lower end of wall 75 and the trough. These short floor sections 74 and 76 virtually form narrow ledges upon which an operator may stand within the carrier to sweep or move residues of forage or grains within the carrier to the trough and also to clean out the carrier when required. On the other hand, the inclined positions of the rear and front walls 73 and 75 virtually convert the carrier into a large hopper which, by virtue of its arrangement, however, is quite capacious so as to be useful, which will operate to direct the grains or forage to the trough despite the flat floor sections 74, 75 being interposed between the lower ends of the sloping rear and front walls and the trough to which the material is directed.

Above the front, rear and side walls of the carrier may be located or erected screen walls, generally indicated at 77, to increase the capacity of the carrier, especially when forage is to be carried and delivered thereby, such screen structure being erected to any desired height in order to provide the necessary capacity, as may be required.

In order to provide access to the interior of the carrier for clearing out the residue of forage or grains which may be located therein after the major portion thereof has been unloaded by means of feed screw or spiral 63, the near side 72 has a lower intermediate opening 78 normally closed by a vertically-slidable door 79 having a handle 80 by which to manipulate it, this door being slidable between a pair of spaced rails 81, 82 secured to side 72 at the sides of opening 78 and extending upwardly therefrom. Obviously, when the door 79 is raised by grasping handle 80 to slide the door upwardly between rails 81 and 82, the opening 78 will be exposed so that the forage or grains indicated at 83 will be brought to view accessibly through opening 78, and when the supply of forage or grains within the carrier has become so low by unloading through trough 25 and the open end 26 thereof that the operator may climb into the carrier through opening 78, it will be possible to stand upon floor sections 74 and 76 to bring the remaining portions of the material within carrier 7 to the trough so that the carrier will be fully unloaded. If desired, door 79 may be hinged to side 72 instead of being slidable, and may be swung outward or even removed altogether to expose opening 78.

While the gears 58 and 59 have been termed bevel gears, they may be mitre gears, if so desired, and the ratio of rotation of shaft 55 to that of shaft 32 being obtained by selecting different relative sizes of pulleys 49 and 51 for the purpose. On the other hand, in order to ensure transfer of rotation from pulley 49 on shaft 32 to pulley 51 on shaft 55, the belt 50 is provided with a follower roller 84, best seen in Figure 2, and mounted on a follower arm 85 which in turn is mounted upon a pivot mounting 86 on crosspiece 28 and biased by a spring 87 against the belt to retain the latter sufficiently tense to produce maximum friction between said belt and the pulleys 49 and 51.

The carrier may, of course, be so arranged that it can be reversed so that instead of discharging the grains or forage through the near side or end of the trough on the carrier, the entire arrangement may be such that unloading occurs from the opposite side of the wheeled base, when required. In any event, unloading always occurs from the intermediate portion of one side of the carrier, and it is thus relatively easy to draw the carrier to position, as it may simply be rolled into place in order to unload the grains or forage contained therein through the open end of the trough 25 into a hopper or any other receiving member or container at will, and it is never necessary to back the carrier into position as is the case with conventional rear unloading carriers.

In order to protect the hands and person of the operator when working around the carrier, the forwardly-projecting end of shaft 32 and the universal joint 34 are preferably surrounded or covered by a protecting shield 28 secured to the lower portion of the front end of the central forward floor-supporting member 30, as best seen in Figure 2.

Although certain details have been described in conjunction with a power take-off from a tractor, it is self-evident that the unloader may be directly operated by an electric motor, an internal combustion engine, or other prime mover, which may even be mounted on the carrier itself, if desired.

Manifestly, other variations may be resorted to and parts and features may be modified or used without others within the scope of the appended claims.

Having now fully described my invention, I claim:

1. A combined grain and forage carrier and unloader, including a wheeled vehicle having means for hitching it to a tractor, a floor upon the vehicle having a depressed transverse trough therein which is open at one end thereof to one side of said vehicle to serve as an unloading portion thereof, a rotatable feed screw extending through the trough toward the open end of the latter, a pair of longitudinally-aligned bearings disposed beneath the floor of the vehicle, a driven shaft rotatably mounted in said bearings and extending forwardly from the vehicle and having a power take-off end adapted to be connected to the power take-off shaft driven from a tractor, an inner closed end upon said trough having a hole therethrough, a gear casing disposed between the rear closed end of said trough and the side of the carrier remote from the open end of the trough, a bevel gear located in said gear casing and having a shank thereon, a spindle upon said feed screw having a hollow end extending into said gear casing and secured upon the shank of the gear therein, a bearing in said gear casing for the hollow end of said spindle, a pair of further bearings in said casing, a shaft rotatably mounted in said further bearings, a gear upon said shaft meshing with the first-mentioned gear in said casing, a pulley disposed upon the last-mentioned shaft externally of said gear casing, a pulley mounted upon the rear end of the first-mentioned driven shaft, a belt interconnecting the two pulleys on the two shafts, a pair of inclined downwardly-converging front and rear walls on said vehicle terminating at the lower ends thereof upon said floor forwardly and rearwardly of said trough, and side walls upon said vehicle disposed on said floor at both sides of said front and rear walls to enclose a forage or grain-carrying space upon said carrier between said front, rear and side walls.

2. Unloading mechanism for grains and forage, including a support, aligned bearings fixed on the latter, a driven shaft rotatably mounted in the bearings and having power take-off means upon one end for connection to drive means upon a tractor, a pulley fixed on the other end of said shaft, a gear casing mounted upon the support, a pair of aligned bearings in the gear casing, a second shaft rotatably mounted in the latter bearings with one end extending exteriorly of said casing, a pulley fixed on the extending end of the second shaft, a belt interconnecting the pulleys, a gear fixed upon said second shaft within said gear casing, a further bearing in the latter, a second gear within said gear casing meshing with the first-mentioned gear, a shank on the second gear extending into the further bearing, a horizontally-disposed and upwardly-open trough mounted upon said support in substantial alignment with the shank on the second gear and having one end open remote from the gear casing to serve as an unloading opening or delivery portion, an elongated grain or forage feed screw longitudinally-disposed in said trough, a hollow spindle upon said feed screw having the end thereof rotatably mounted in said further bearing and fixed upon the shank on the second gear so that rotation of said second gear will cause rotation of said feed screw, and means for directing grain or forage to the trough and the feed screw therein for delivery from the open end of said trough by means of said feed screw when said driven shaft is operated from a tractor.

3. Unloading mechanism for grains and forage, including a support, aligned bearings fixed on the latter, a driven shaft rotatably mounted in the bearings and having means upon one end for receiving a drive from a prime mover, a pulley fixed on the other end of said shaft, a gear casing mounted upon the support, a pair of aligned bearings in the gear casing, a second shaft rotatably mounted in the latter bearings with one end extending exteriorly of said casing, a pulley fixed on the extending end of the second shaft, a belt interconnecting the pulleys, a gear fixed upon said second shaft within said gear casing, a further bearing in the latter, a second gear within said gear casing meshing with the first-mentioned gear, a shank on the second gear extending into the further bearing, a horizontally-disposed and upwardly-open trough mounted upon said support in substantial alignment with the shank on the second gear and having one end open remote from the gear casing to serve as an unloading opening or delivery portion, an elongated grain or forage feed screw longitudinally-disposed in said trough, a hollow spindle upon said feed screw having the end thereof rotatably mounted in said further bearing and fixed upon the shank on the second gear so that rotation of said second gear will cause rotation of said feed screw, and means for directing grain or forage to the trough and the feed screw therein for delivery from the open end of said trough by means of said feed screw when said driven shaft is operated from a tractor.

4. A combined grain and forage carrier and unloader, including a wheeled vehicle having means for hitching it to a tractor, a floor upon said vehicle having a depressed transverse trough therein, said trough having one end extending through a side of said vehicle and having the other end closed and spaced from the opposite side of said vehicle, a feed screw extending through the trough toward the open end of the latter and mounted for rotation about a horizontal axis, and means for effecting the rotation of said screw feed, said means comprising a spindle having one end extending through the closed end of said trough and fixedly secured to the adjacent end of said screw feed, a bevel gear positioned adjacent the other end of said spindle and fixedly secured to the latter, a horizontally disposed rotatable shaft carried by said vehicle adjacent said bevel gear, a second bevel gear fixedly secured to said shaft and meshing with said first named gear, a driven shaft arranged in parallel spaced relation with respect to said first named shaft and mounted in the floor of said vehicle for rotation about a horizontal axis, means interconnecting one end of said driven shaft to the source of motive power for said tractor, and means on the other end of said driven shaft operatively connecting the latter to said first named shaft.

5. A combined grain and forage carrier and unloader, including a wheeled vehicle having means for hitching it to a tractor, a floor upon said vehicle having a depressed transverse trough therein, said trough having one end extending through a side of said vehicle and having the other end closed and spaced from the opposite side of said vehicle, a feed screw extending through the trough toward the open end of the latter and mounted for rotation about a horizontal axis, and means for effecting the rotation of said screw feed, said means comprising a spindle having one end extending through the closed end of said trough and fixedly secured to the adjacent end of said screw feed, a bevel gear positioned adjacent the other end of said spindle and fixedly secured to the latter, a horizontally disposed rotatable shaft carried by said vehicle adjacent said bevel gear, a second bevel gear fixedly secured to said shaft and meshing with said first named gear, a driven shaft arranged in parallel spaced relation with respect to said first named shaft and mounted on the floor of said vehicle for rotation about a horizontal axis, means interconnecting one end of said driven shaft to the source of motive power for said tractor, and means on the other end of said driven shaft operatively connecting the latter to said first-named shaft, said last named means comprising a pulley wheel disposed upon said other end of said driven shaft and fixedly secured to the latter, another pulley arranged in side by side spaced relation with respect to said first named pulley and fixedly supported on said first named shaft, and a belt interconnecting said first and second named pulleys.

WALTER H. REINKING.

REFERENCES CITED

The following references are of record in the file of this patent:

UNITED STATES PATENTS

| Number | Name | Date |
|---|---|---|
| 1,515,328 | Barkmann et al. | Nov. 11, 1924 |
| 1,597,845 | Vasquez | Aug. 31, 1926 |
| 2,116,807 | Thrall | May 10, 1938 |
| 2,139,417 | Milan | Dec. 6, 1938 |
| 2,438,301 | Schulte | Mar. 23, 1948 |
| 2,470,836 | Piper | May 24, 1949 |